Oct. 23, 1923.  
E. RUSSELL-CLARKE  
1,471,684  
CALCULATING MACHINE  
Filed Dec. 9, 1919  14 Sheets-Sheet 1

Oct. 23, 1923.
E. RUSSELL-CLARKE
1,471,684
CALCULATING MACHINE
Filed Dec. 9, 1919   14 Sheets-Sheet 2
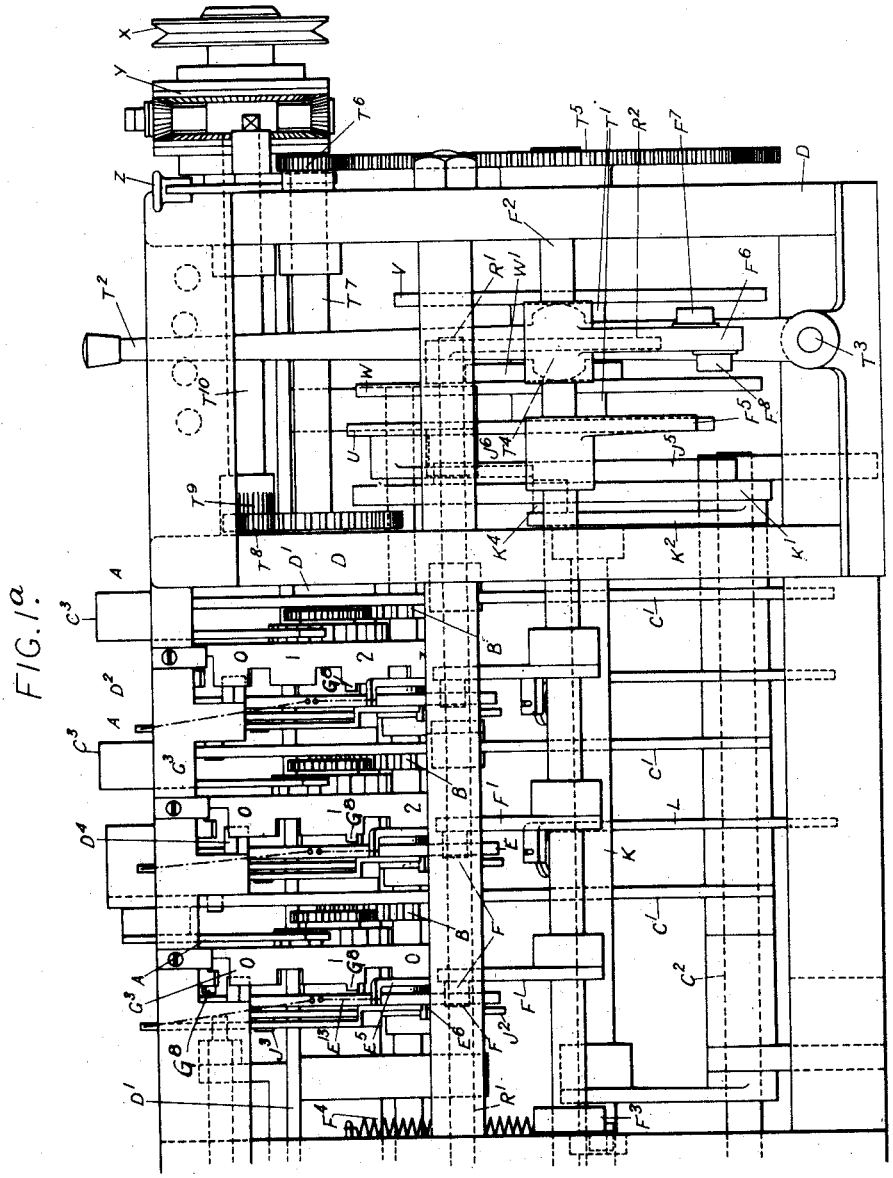

Oct. 23, 1923.
E. RUSSELL-CLARKE
1,471,684
CALCULATING MACHINE
Filed Dec. 9, 1919   14 Sheets-Sheet 3
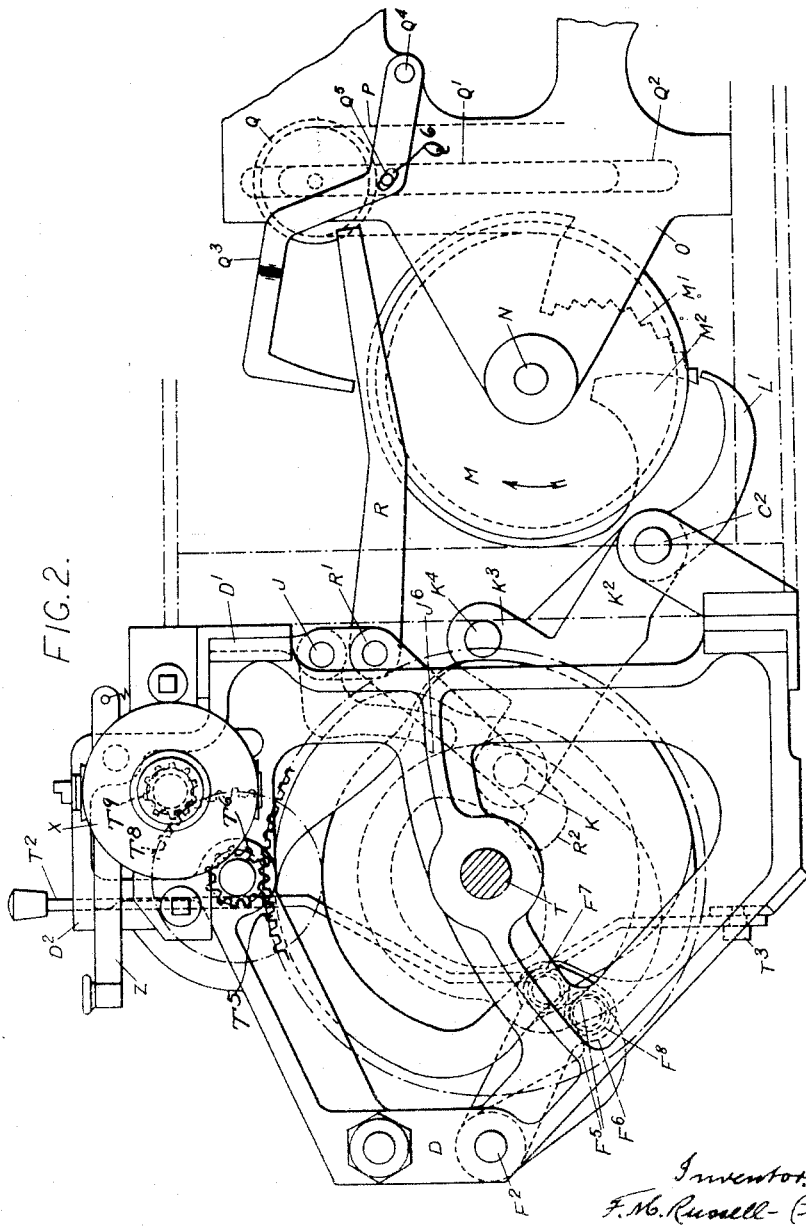

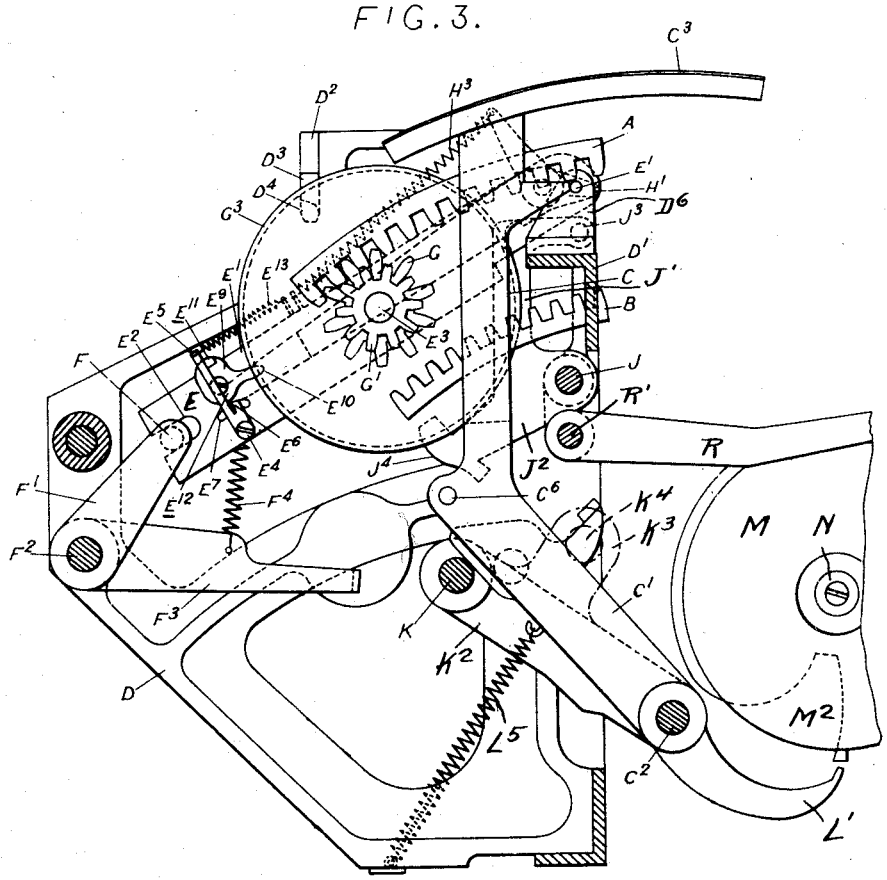

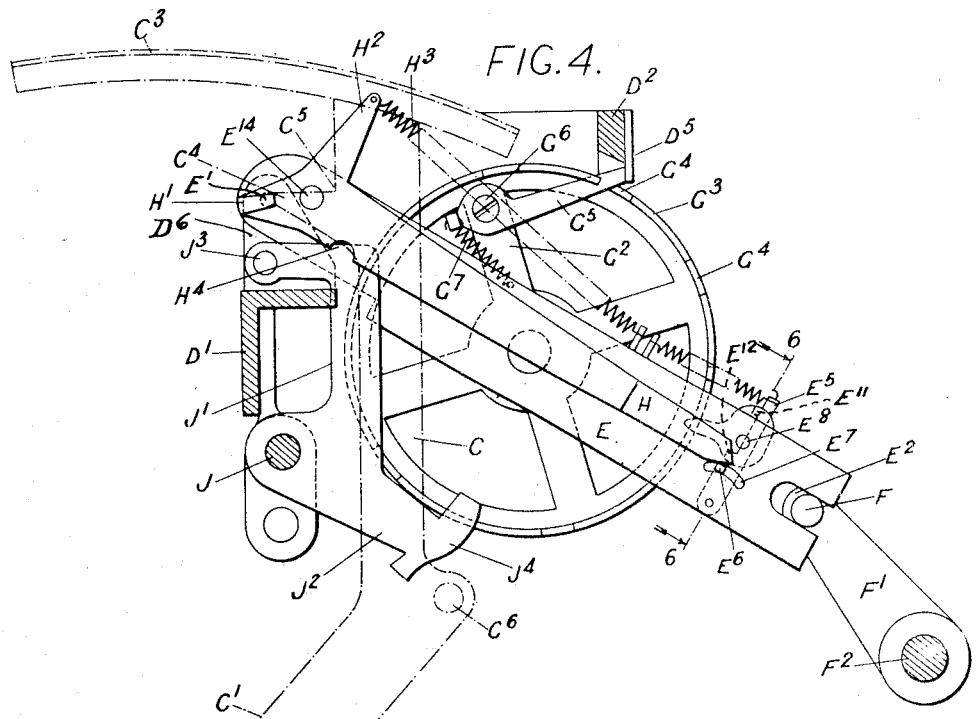
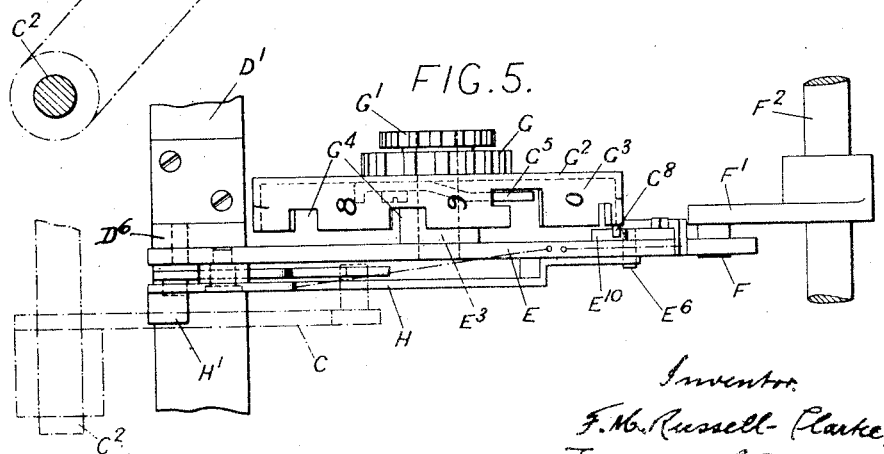

Oct. 23, 1923.
E. RUSSELL-CLARKE
1,471,684
CALCULATING MACHINE
Filed Dec. 9, 1919 14 Sheets-Sheet 6
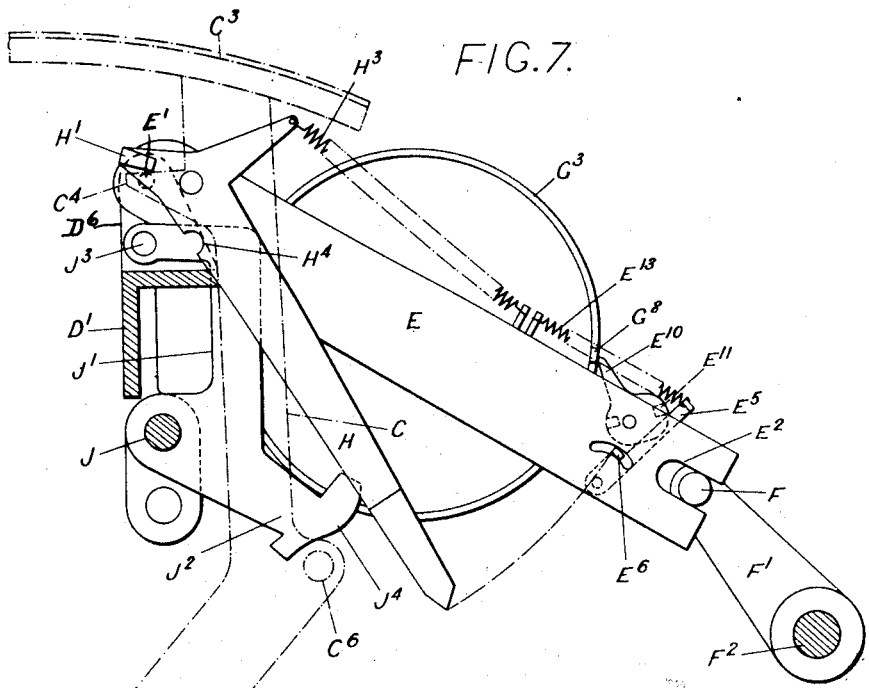
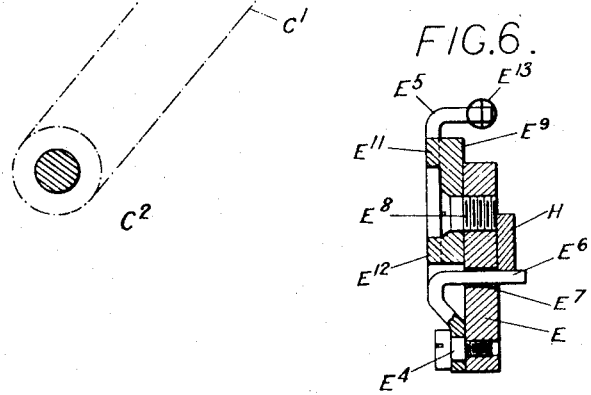

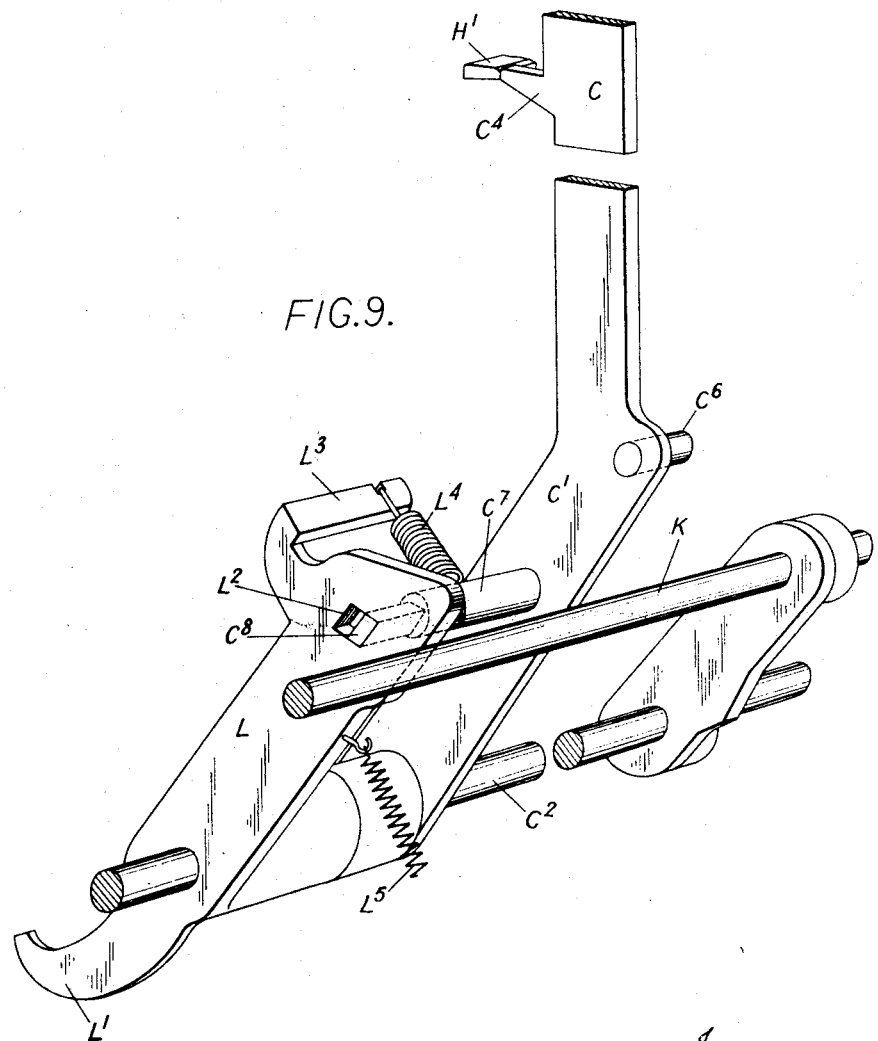

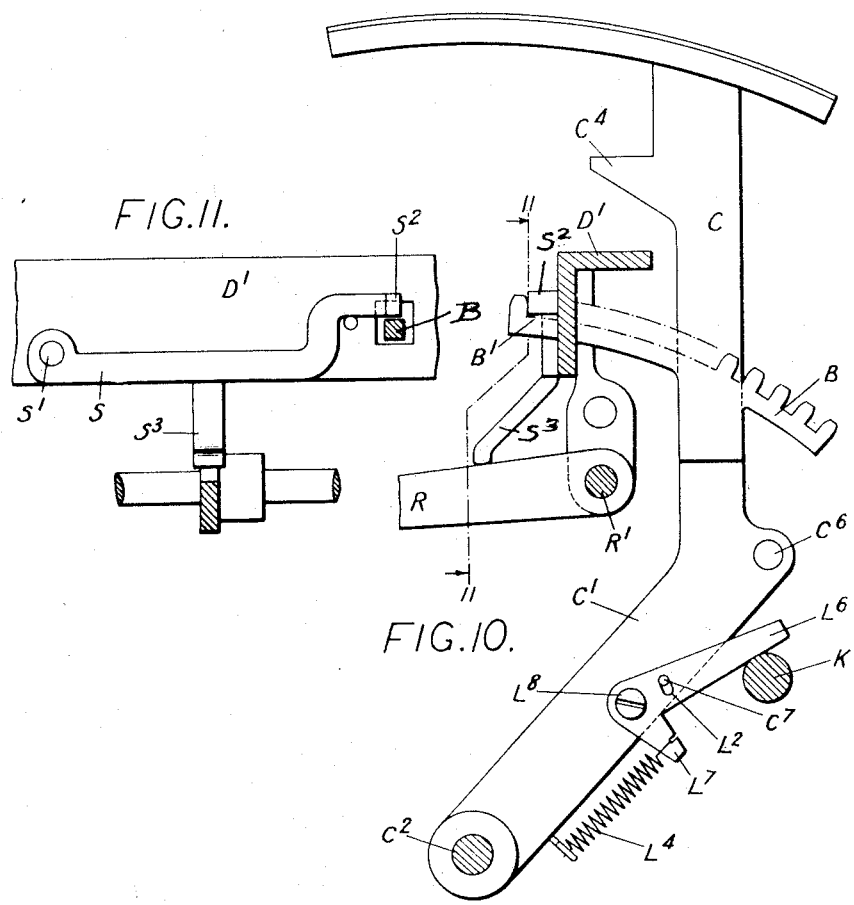

Oct. 23, 1923.

E. RUSSELL-CLARKE 1,471,684

CALCULATING MACHINE

Filed Dec. 9, 1919     14 Sheets-Sheet 10

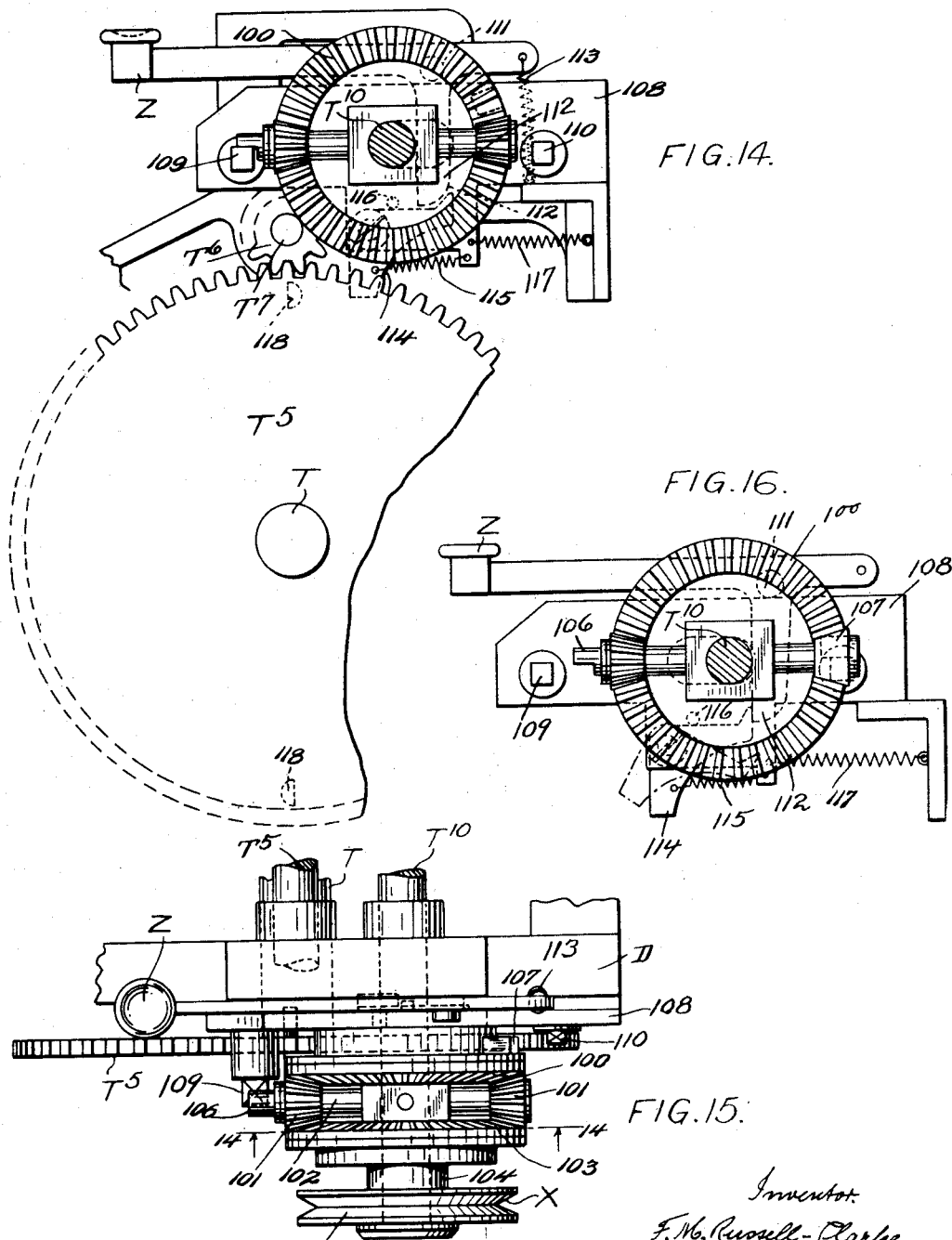

Oct. 23, 1923. 1,471,684
E. RUSSELL-CLARKE
CALCULATING MACHINE
Filed Dec. 9, 1919   14 Sheets-Sheet 14

Patented Oct. 23, 1923.

1,471,684

UNITED STATES PATENT OFFICE.

EDWARD RUSSELL-CLARKE, DECEASED; BY FRANCES MAUD RUSSELL-CLARKE, EXECUTRIX, OF LONDON, ENGLAND, ASSIGNOR TO AUTOKAL SYNDICATE LIMITED, OF LONDON, ENGLAND.

CALCULATING MACHINE.

Application filed December 9, 1919. Serial No. 343,630.

*To all whom it may concern:*

Be it known that I, (Mrs.) FRANCES MAUD RUSSELL-CLARKE, a subject of the King of Great Britain, and residing at London, in England, sole executrix of EDWARD RUSSELL-CLARKE, late a subject of the King of Great Britain, who invented certain new and useful Improvements in Calculating Machines, of which the following is a specification.

This invention relates to calculating machines more especially those for performing addition or subtraction and has for its object to simplify the construction of such machines and to produce a machine which may either be used separately or combined with a calculating machine of another type for example one which is adapted for the performance of multiplication.

According to this invention the machine is built up of a series of co-operating mechanical units each comprising a pair of pivotally mounted concentric sectors one toothed on its concave side and the other toothed on its convex side. A double pinion carrying a numbered wheel is so mounted on a movable member that the pinion can be brought into engagement with either of the sectors the number wheel being locked against rotation except when the pinion and a sector are engaged. Each pair of sectors can be set or positioned in accordance with the value of an item fed into the machine and after being so set the pinion of a number wheel is brought into engagement with one or other of the sectors according to whether addition or subtraction is to be performed and the sector is then moved back to its zero point in so doing rotating the number wheel to the extent determined by the original setting of the sector. The limit of movement of each sector in a zero direction is determined by a removable stop and when a number wheel has been rotated beyond a "carry" point it operates a trigger which brings about the removal of the stop limiting the movement of the sectors in the mechanical unit of next highest denomination. Thus when these sectors are returned towards their zero point they can move past this point to the extent of one integer and in so doing rotate the number wheel controlled by them to the extent of one additional integer as required by the "carry."

The several units which make up the complete machine are disposed side by side so that they can be controlled simultaneously by rock shafts, levers and bars actuated by rotating cams. Certain of these cams are constantly acting but three other cams are provided which can be alternatively clutched to the main shaft for the purpose of actuating the mechanism in accordance with whether the machine is to be used for performing addition or subtraction or if it is to be "cleared," that is to say if any existing sum which may be set up is to be wiped out and the number wheels restored to zero.

After an item has been fed into the machine in some convenient manner the mechanism is actuated and performs a cycle. When the parts are in their initial positions at the commencement of a cycle each number wheel pinion is in engagement with its outer or addition sector. At the beginning of the cycle the plates or other members carrying the number wheels are lowered the pinions being thereby removed out of engagement with the addition sectors and locked. Simultaneously all the carry devices are reset. The sectors are now all simultaneously released and fall freely into the positions determined by the keys or other mechanisms which have been operated in the process of feeding the item into the machine. The first half of the cycle is now complete. The second half of the cycle commences with the simultaneous movement of all the number wheel plates upwards or downwards according as addition or subtraction is to be performed the number wheel pinions thus being brought into engagement with their respective sectors. All the sectors are now moved back again to their zero positions and as they move they rotate the number wheels, the necessary carries taking place during this process. The result of the sum performed is now exhibited and the cycle is completed.

The accompanying drawings illustrate one form of a machine constructed in accordance with this invention. This machine is arranged for dealing with money sums and has a capacity extending from one penny up to £9,999.19.11.

Figure 1 and Figure 1ª together show an elevation of the front of the machine the left hand portion appearing in Figure 1 and the right hand portion in Figure 1ª.

Figure 2 is an elevation of the right hand side of the machine as viewed in Figure 1, the external gear wheels being removed.

Figure 3 is a side elevation of the mechanism comprised in one of the units the view being taken from the right hand side of the machine.

Figure 4 illustrates the carry mechanism and is a side elevation of part of the mechanism comprised in a unit, the view being taken from the left hand side of the machine as shown in Figure 1. The carry mechanism is here shown in its set position.

Figure 5 is a plan of the mechanism shown in Figure 4.

Figure 6 is a section on the line 6—6 of Figure 4 looking in the direction of the arrows and illustrates on a larger scale a detail of the carry mechanism.

Figure 7 is a view similar to Figure 4 illustrative of the operation of the carry mechanism and showing this mechanism when the carry lever has been released.

Figure 9 is a perspective view showing one of the sector levers and the manner in which it is mounted for the purpose of permitting the movement which results when a carry takes place.

Figure 10 is a side elevation taken from the right hand side of the machine showing the construction and arrangement of the sector which deals with thousands of pounds.

Figure 11 is a part sectional view on the line 11—11 of Figure 10 looking in the direction of the arrow.

Figure 14 is a section on line 14—14 of Figure 15;

Figure 15 is a plan view of the mechanism for intermittently connecting the pulley X and shaft T¹⁰, which mechanism is illustrated in elevation at the right hand end of Figure 1ª;

Figure 16 is a section similar to Figure 14 but showing the parts in a different position;

Like letters indicate like parts throughout the drawings,

Figure 1:
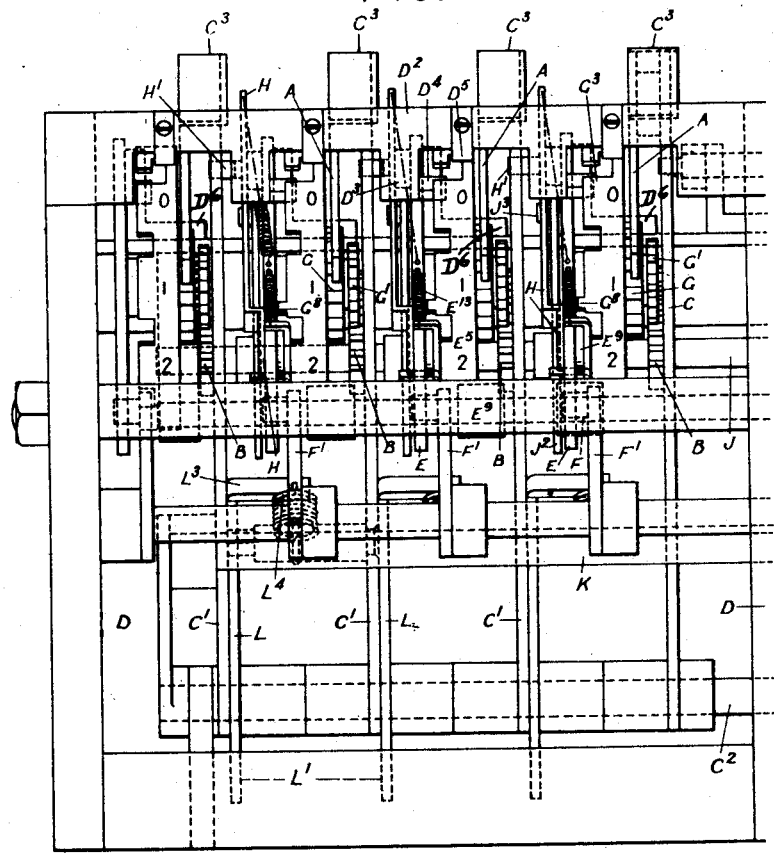

As the principal parts comprised in a unit mechanism are most clearly shown in Figures 3, 4 and 5 it is convenient first to refer mainly to those figures but many of the parts may also be seen in their relative positions in the several units in Figures 1 and 2.

The curved toothed sectors A and B are both mounted concentrically on the outer part C of a lever which conveniently forms an angle with the part C' adjacent to the shaft C² on which the lever can turn. On the end of the lever C C' is disposed a curved plate C³ on the outer face of which numbers are engraved. Towards the upper part of the back of the side frames D on a bracket D⁶ fixed to a horizontal frame member D' is pivoted a lever in the form of a plate E which is inclined from its pivot E' towards the front of the machine. The free end of this plate E is forked as at E² to engage a pin F on the end of a lever F' keyed on a shaft F² whose ends are carried in bearings in the frame members D. A lever F³ also keyed on the shaft F² is directed towards the rear of the machine and has connected to it one end of a spring F⁴ whose other end is attached to the frame. On a stud E³ projecting from one side of the plate E is mounted a double pinion G G'. That portion G of this pinion which has the larger diameter has teeth adapted to engage the outer toothed rack A which rack operates for the purpose of performing addition. The smaller part G' of the pinion has teeth adapted to engage the inner rack B which performs the operation of subtraction. Connected to the double pinion G G' is a number wheel comprising spokes G² and a peripheral flange G³, which is directed towards the face of the plate E as clearly shown in Figure 5. In the flange G³ are formed a series of equidistant notches G⁴, which alternate with numbers which are engraved on the face of the flange. One of these notches is cut somewhat deeper and in it lies the end of a lever G⁵ pivoted at G⁶ on one of the spokes of the number wheel and controlled by a spring G⁷ which tends to keep the end of the lever G⁵ projecting through the opening in the flange G³.

Figure 22:
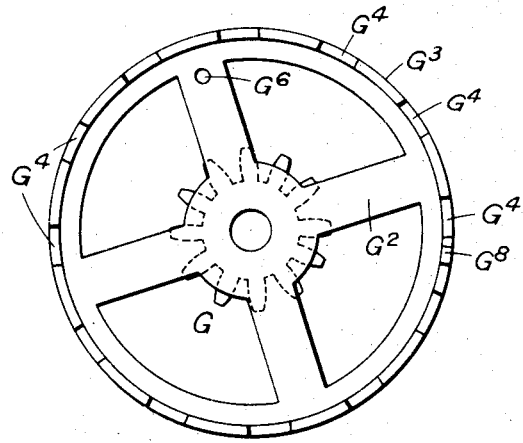
Figs. 22 and 23 show respectively side and front elevations of the pence number wheel.
Figure 23:
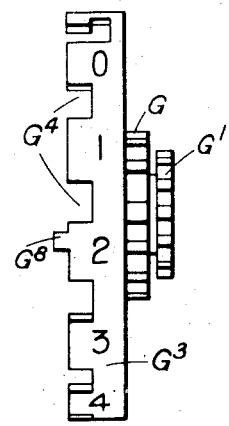
Figure 24:
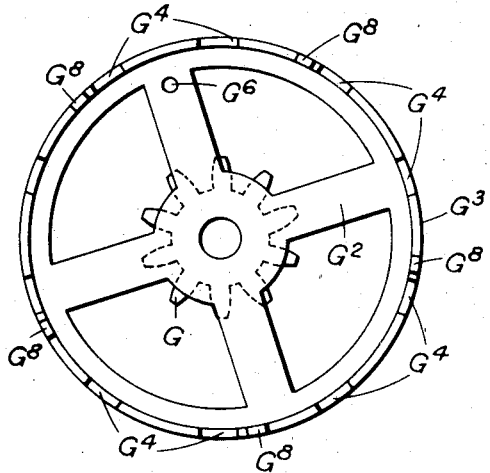
Figs. 24 and 25 show similar views of the tens of shillings number wheel.
Figure 25:
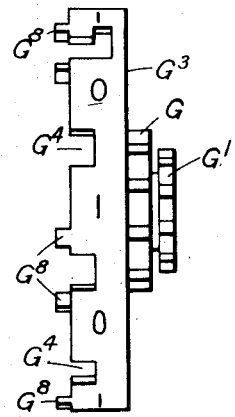

The number wheels have somewhat different constructions according to the value of the amounts they have to deal with. Thus the pence number wheel which is the right hand wheel in Figure 1ª and is also shown separately in Figures 22 and 23 has 12 notches $G^4$ in its flange instead of 10 as in the other wheels. The tens of shillings number wheel, that is the left hand wheel of Figure 1ª, has 10 notches $G^4$ in its flange but is provided with five carry projections $G^8$ which are equally spaced around its circumference. This number wheel is also shown separately in Figures 24 and 25. The remaining number wheels serving respectively for units of shillings, units of pounds, tens of pounds, hundreds of pounds and thousands of pounds are all similar and arranged in the manner shown in Figures 4 and 5, except that the thousands of pounds wheel has no carry projection $G^8$.

On the same side of the plate E as the number wheel and adjacent to the flange $G^3$ thereof is pivoted at $E^4$ a lever having two arms one of which $E^5$ lies parallel to the face of the plate E and is upwardly directed, its upper end being bent over to overlie the edge of the plate E while the other $E^6$ is bent over at right angles and passes through a quadrantal slot $E^7$ formed in the plate E. The end of the lever $E^6$ projects through this slot on the opposite side of the plate E (see Figure 6). Between the lever $E^5$ and the face of the plate E is pivoted at $E^8$ a small plate $E^9$ which has a projecting arm or detent $E^{10}$ and carries on its face two lateral projections $E^{11}$ and $E^{12}$ which normally lie close to the sides of the lever $E^5$. The detent $E^{10}$ lies beside the edge of the flange $G^3$ of the number wheel in such a position that when this wheel rotates beyond a certain point the detent $E^{10}$ will be struck by a pin $G^8$ which projects laterally from the edge of the flange $G^3$ as shown in Figure 5. The point in the rotation of the number wheel when the pin $G^8$ strikes the detent $E^{10}$ is termed the carry point. A spring $E^{13}$ is connected at one end to the end of the lever $E^5$ and at the other to some fixed point on the plate E. The action of this spring tends to keep the lever $E^5$ in contact with the two projections $E^{11}$ and $E^{12}$ thereby maintaining the detent $E^{10}$ in a mid-position but permitting it and the plate $E^9$ to turn in either direction about its pivot. As the number wheel rotates past the carry point the detent $E^{10}$ is moved about its pivot by the pin $G^8$ and snaps over this pin. The movement thus imparted to the plate $E^9$ is communicated through either the projection $E^{11}$ or the projection $E^{12}$ to the levers $E^5$, $E^6$ as shown in Figure 7, according to the direction of rotation of the number wheel and the direction in which it moves the detent $E^{10}$.

Pivoted at $E^{14}$ on the side of the plate E remote from the number wheel is a three-armed lever. The longest of these arms H is forwardly directed and lies beside the face of the plate E with its end over the projecting end of the lever $E^6$. A second arm is directed towards the rear of the machine and carries a lateral projection H' as shown in Figures 4 and 5. A third arm $H^2$ is upwardly directed and has connected to it one end of a spring $H^3$ the other end of which is attached to some fixed point on the plate E. It will be seen that so long as the detent $E^{10}$ remains in its mid-point the end of the lever $E^6$ will engage the end of the lever H, and hold it in the position shown in Figure 4. If, however, the detent $E^{10}$ is struck by the pin $G^8$ as the number wheel passes a carry point the lever $E^6$ will be moved clear of the end of the lever H and the latter will be caused to drop under the influence of the spring $H^3$. The projection H' constitutes a stop which limits the movement towards the rear of the machine of the sector lever C C' in the next adjacent unit mechanism of higher denomination. There is a rearwardly directed projection $C^4$ on the part C of each sector lever which is so disposed as to engage the projection H'. When the lever H, which may conveniently be termed the carry lever, has been permitted to drop by reason of the lever $E^6$ having been moved clear of its end, the projection H' is moved upwardly into such a position that it is clear of the sector lever projection $C^4$. This sector lever C can then move to a further extent towards the rear of the machine the projection H' entering the angle $C^5$. The position then assumed by the carry lever H is shown in Figure 7. It will there be seen that the sector lever C belonging to the unit of next highest denomination has been permitted an over movement towards the rear of the machine in consequence of the projection H' having been taken out of the path of the sector lever projection $C^4$. Thus the sector lever C can move to the extent of one integer beyond its true zero position in which it is shown in Figure 4.

Figure 8:
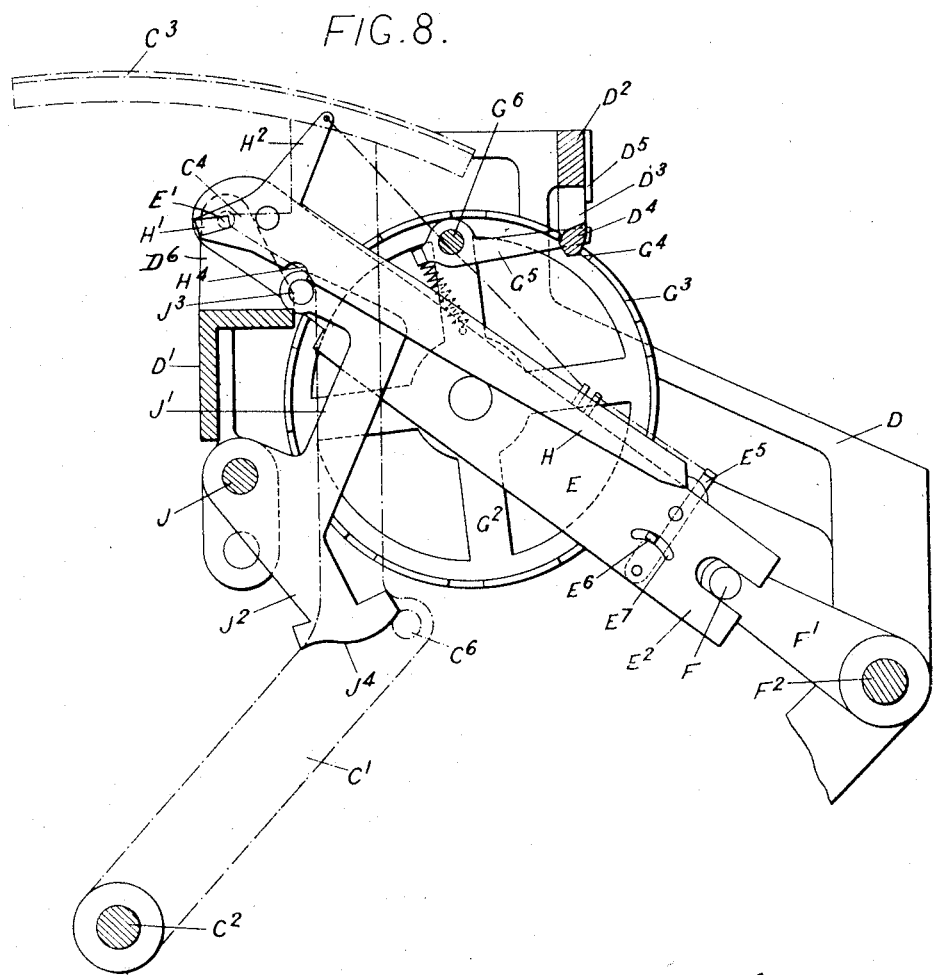
Figure 8 is again a view similar to Figure 4 showing the resetting of the carry mechanism.

The carry lever H is lifted and reset by means of the following mechanism. In suitable bearings disposed on the underside of the horizontal frame member D' is carried a rockshaft J on which are keyed a series of two-armed levers J' $J^2$ so spaced apart that each lever forms a portion of a unit mechanism. One of the lever arms J' is upwardly directed and provided with a laterally projecting pin $J^3$ so placed that it can strike the underside of the carry lever H which has a notch $H^4$ formed in it to receive this pin. The lever arm $J^2$ has a T-shaped end with a curved outer face $J^4$ which is presented to a laterally projecting pin $C^6$ carried by the sector lever C C'. When the carry lever H has been released and has dropped into the position shown in Figure 7 it can be lifted and reset at the appropriate time if the shaft J and lever J' J² are rocked by mechanism to be hereafter described. The pin J³ enters the notch H⁴ and the lever H is raised, its bevelled end pushing aside the end of the lever E⁶, until the parts are in the positions shown in Figure 8. The pin J³ has here moved past and out of the notch H⁴. At the same time the curved end J⁴ of the lever arm J² has struck the pin C⁶ and pushed the sector lever C C' forward into its true zero position so that the projection C⁴ on the back of the sector lever C is clear for the carry lever projection H' to move down again and hold the sector lever in its zero position. When the shaft J and lever J' J² rock back into the positions shown in Figure 4 the carry lever H drops until its end rests once more on the end of the catch lever E⁶. The resetting of the carry mechanism is now completed.

On a horizontal bar D² forming part of the framing of the machine are disposed at intervals, according to the positions of the number wheels, a series of downwardly directed brackets D³ each of which carries on the side of the bracket adjacent to the number wheel a lateral projection D⁴. The shape and dimensions of this projection D⁴ are such that it can pass freely through any one of the notches G⁴ in the flange of the number wheel as this wheel is raised or lowered by the movement of the plate E about its pivot. If the movement of the plate E is checked at a midpoint the projection D⁴ will lie in one of the notches G⁴ and lock the number wheel against rotation. Adjacent to each bracket D³ but positioned over the face of the flange G³ of each number wheel is a downwardly directed plate D⁵ which can engage the end of the lever G⁵ which projects through the slot or notch in the flange G³ of the number wheel. When this lever G⁵, which constitutes a pawl, is in engagement with the plate D⁵ the number wheel is in its zero position.

As will be seen all the plates E with the number wheels and pinions carried thereon can occupy three distinct positions according to the movement imparted to the ends of these plates by the levers F' when the shaft F² is rocked. The first and normal position occupied by each plate E when the parts are in their initial or zero positions is that in which this plate is shown in Figures 3 and 4. Here the free end E² of the plate E has been raised to its limit position in which the pinion G is in engagement with the outer toothed sector A. The projection D⁴ now lies within the flange G³ of the number wheel which is therefore free in so far as obstruction by this projection D⁴ is concerned to be rotated by the movement of the toothed sector A. In the second or intermediate position the plate E is partially lowered with the result that the pinion G is removed from engagement with the toothed sector A. The plate E has not been lowered sufficiently far however to bring the pinion G' into engagement with the inner toothed sector B. The plate E and the number wheel carried thereby are now in the positions shown in Figure 8 where it will be seen that the projection D⁴ has been brought into one of the notches G⁴ in the flange G³ of the number wheel. Thus the number wheel is locked against rotation in the position in which it has been set and remains so while neither of the pinions G or G' is in engagement with a toothed sector A or B. In the third position the end of the plate E is lowered still further to its limit position when the pinion G' is in engagement with the inner toothed sector B. The accompanying drawings do not show the parts in the position which they then occupy but they will be clearly understood from Figures 3, 4 and 8. As the number wheel was lowered the projection D⁴ passed through the notch G⁴ in the number wheel flange G³ and the latter is now therefore clear of this projection so that the number wheel can be rotated by the movement of the sector lever C C'.

It will be convenient here to detail the operation of the described parts of a unit mechanism when the machine is employed for performing a sum.

As already mentioned the plate E is initially in its first or fully raised position with the pinion G in engagement with the outer toothed sector A. Assuming that an item has been fed into the machine in some convenient manner such as will be hereinafter described more in detail, it is to be noted that that process involves no movement of the parts of the unit mechanisms until the actuation of that mechanism which causes the various portions of the machine to perform their several functions which bring about the desired result. It may be remarked here, however, that the feeding in of the item determines the extent to which each sector lever C C' can move towards the front of the machine.

When addition is to be performed the first result of putting the actuating mechanism into operation is to rock the shaft F² so as to lower the plate E from its first or upper position into its second or intermediate position. As already explained this moves the pinion G out of engagement with the outer toothed sector A and locks the number wheel by engaging the projection D⁴ with that notch G⁴ in the number wheel flange which is presented to it. The plate E and number wheel are now in the positions shown in Figure 8. At this stage the shaft J is rocked so as to operate the lever J' J² and reset the carry lever H in the manner described. The sector levers C C' have so far all been retained in their raised and zero positions by the action of a bar K which lies beneath all these levers and operates in a manner which will hereafter be detailed to raise the levers C C'. At this stage this bar K has moved away and all the sector levers C C' are allowed to turn on the shaft C² and fall towards the front of the machine. The distance that each lever C C' moves is determined by the figures in the item that has been fed into the machine. The shaft F² is now once more rocked so as to raise the plate E once more until the pinion G is again in engagement with the outer toothed sector A. Finally the bar K once more lifts all the sector levers C C' moving them back again to their zero positions. As each of these levers moves it causes rotation of the corresponding number wheel so that this wheel has now been rotated the same number of integers as the sector had previously been allowed to fall, assuming that no carry has taken place into that unit mechanism.

When subtraction is to be performed the initial operation of the actuating mechanism is the same as in the case of addition namely the shaft F² is rocked and the plate E is lowered from its first or upper position into its intermediate position. It is assumed of course that previously the item to be dealt with has been fed into the machine. After the pinion G has been moved out of engagement with the rack A by the lowering of the plate E the shaft J with the lever J' J² is rocked so as to reset the carry lever H and return the levers C C' to zero and the bar K then is moved so as to allow the sector levers C C' to fall to the determined positions. The shaft F² is now once more rocked so as to lower the plate E still further and bring the pinion G' into engagement with the inner toothed sector B. The bar K is now moved back again so as to lift the sector levers C C' and return them to their zero positions this movement causing the rotation of each number wheel but as will noted this rotation takes place in the reverse direction to that which occurs when addition is being performed. Finally when the sectors have been returned the plate E is moved up so as to bring the pinion G once more into engagement with the outer sector A.

If a carry is necessary this is effected as the sector levers C C' are returned to their zero positions. If no carry occurs then the limit of the movement of each of these levers, when it is pushed back towards the completion of the cycle by the bar K, is determined by the sector lever projection C⁴ coming in contact with the carry lever projection H'. If, however, in the process of returning a sector lever it causes the rotation of its number wheel beyond a carry point the carry lever H is released and drops in the manner described and then as the sector levers are pushed back the sector lever in the unit of next highest denomination, into which number wheel the carry is to take place, is free to be moved by means hereinafter set forth further back than would otherwise be possible because the carry lever projection H' has now been removed from the path of this sector lever projection C⁴. The result is that the number wheel which is being rotated by the movement of this sector lever receives a further rotation to the extent of one integer. The operation is the same whether addition or subtraction is being performed. The actuating mechanism is so arranged that at the commencement of a cycle the plate E is moved from its extreme upper position and the pinion G taken out of engagement with the toothed sector A before the carry levers are reset, since in the process of this resetting, as already described, the sector lever C C' is moved forward into its true zero position and this movement must not be imparted to the number wheel.

Provision is made for returning all the number wheels to zero so as to clear the machine in order to start a fresh series of operations. By suitable manipulation of the actuating mechanism, which will be described hereafter, this clearing is effected in the following way:—In the first place by rocking the shaft F² the plate E is lowered into its intermediate position and while in this position all the carry levers are reset. Next the plate E is raised so as to bring the pinion G into engagement with the rack A. The bar K now moves away so as to release the sector levers C C' which all fall forward and in so doing rotate the several pinions G and number wheels. The extent to which each of the sector levers can move in this case is determined by the detent lever G⁵ the end of which strikes the plate D⁵ and prevents further rotation of the number wheel when it has reached its zero position. The plate E is now again lowered into its intermediate position and each sector lever C C' is raised by the bar K, the return movement of the sectors in this case, as will be noted, having no effect on the number wheels. When the sectors are all in their zero positions the plate E is again raised bringing the pinion G once more into engagement with the sector A so that at the end of the cycle the parts are in their respective positions in readiness for the commencement of a new operation. The number wheels are now all at zero as also the sectors C².

It will be apparent that when a carry takes place some device is necessary to permit the sector lever C C' in the unit mechanism into which the carry is effected to be moved back by the bar K the requisite distance equivalent to one integer beyond the other sectors which are simultaneously lifted by this bar K. The device conveniently used for this purpose is illustrated in Figure 9 which shows a portion of one sector lever C C' and the manner in which the bar K acts thereon. Each lever C C' as already mentioned is loosely mounted on the shaft $C^2$. Adjacent to each lever C C' and also loosely mounted on the shaft $C^2$ is a two-armed lever of which one arm L lies beside the part C' of the sector lever while the other arm L' is formed as a curved finger rearwardly and upwardly directed. A slot $L^2$ is formed in the lever L towards its free end and this lever also carries a laterally projecting arm $L^3$. Projecting from the side of the part C' of the sector lever is a pin $C^7$ having a squared end $C^8$ which lies in the slot $L^2$. A spring $L^4$ is connected at one end to the lateral arm $L^3$ and at the other to the pin $C^7$. A spring $L^5$ is attached at one end to the lever L and at the other to some fixed part of the frame, this spring tending to move the lever L in a forward direction that is to say towards the bar K.

The parts are shown in Figure 9 in their true zero positions with the sector lever projection $C^4$ engaged by the carry lever projection H' and the bar K in its raised position bearing against the lever L. If the pressure which the bar K exerts on the lever L is removed it will be seen that the levers L and C C' will move relatively to one another by reason of the action of the spring $L^4$ the extent of this relative movement being determined by the dimensions of the slot $L^2$. Thus when the bar K has moved away and the lever C C' is free to fall forward the pin $C^8$ is at the end of the slot $L^2$ opposite to that at which it is shown in Figure 9. The two levers L and C C' maintain these relative positions until when the bar K once more lifts the levers the sector projection $C^4$ strikes the carry projection H'. The return movement of the lever C C' is then checked but the lever L can still be moved further back by the bar K the extent of this movement as before being determined by the dimensions of the slot $L^2$. If, however, a carry has to be effected into the unit mechanism of which this sector lever forms part, then as already explained the release of the carry lever H will have moved the projection H' out of the path of the sector lever projection $C^4$. As the bar K now raises the levers the absence of the projection H' will allow the sector lever C C' to be moved further back and the levers will come to rest with the end of the pin $C^8$ at the rearward end of the slot $L^2$ as when the sector lever C C' is falling or in the process of being raised. Thus at the conclusion of the raising of the lever C C' there will now be no relative movement between this lever and the lever L. In this way the over movement of the sectors carried by the lever C C' is obtained and the number wheel rotated by the return of the sector lever receives the necessary extra rotation to the extent of one integer required to effect the carry. As will be seen the arrangement is such that under all ordinary circumstances the levers L and C C' move and are moved and operate as one except when relative movement between these levers is brought about by contact between the carry lever projection H' and the sector lever projection $C^4$.

The desired effect may be obtained with constructions other than that just described and such another construction is in fact conveniently employed in the case of the sector lever comprised in the unit mechanism of highest denomination. In the present machine this unit mechanism deals with thousands of pounds and the modified construction for permitting the over movement of the sector lever is shown in Figure 10. Here in place of the separate lever L L' a small bell crank lever $L^6$ $L^7$ is pivotally mounted at $L^8$ on the side of the lower part C' of the sector lever. The range of movement of the bell crank lever $L^6$ $L^7$ is determined by the pin $C^7$ which projects from the side of the lever C' and engages the slot $L^2$ in the same way as the corresponding parts employed in the construction shown in Figure 9. A spring $L^4$ connects the arm $L^7$ with the lever C'. The bar K strikes the lever $L^6$ and when the carry lever projection H' is presented to the sector lever projection $C^4$ the spring $L^4$ allows the lever $L^6$ $L^7$ to yield during the last part of the lifting movement of the bar K. If a carry is to take place and the projection H' is removed from the path of the projection $C^4$ then the lever C C' moves to the full extent possible without relative movement taking place between this lever and the lever $L^6$ $L^7$.

The means by which an item is initially fed into the machine can vary according to the way in which it is intended to employ the machine. The feeding in mechanism however must be so constructed and arranged that as indicated the movement of the sector levers can be determined in accordance with the value of the integers in the item. A device which may be employed for the feeding in mechanism is shown in Figure 2 and comprises a series of templates conveniently in the form of discs M which are all mounted on a common shaft N carried on fixed brackets forming part of the framing O. A template disc M forms part of each unit mechanism and each template is cut with a series of steps M' each step having a different radial length. Each template is so disposed in relation to the finger portion L' of the lever L connected to the corresponding sector lever C C' that according to the extent to which the template M is rotated the depth of the notch or step presented to it can be felt by the finger lever L'. Thus after a template M has been positioned and the bar K has moved away the sector lever C C' can fall to an extent which is determined by the depth of the notch or step M' which is felt by the finger L'. These steps M' correspond to various integers.

As already indicated when it is desired to clear the machine and return all the number wheels to zero the sector levers C C' are all allowed to fall forward freely and this movement must be to the full extent permitted to these levers in order to ensure the rotation of the number wheels to their zero points. To allow of this there is formed in each template M a deep notch $M^2$ so arranged that if this notch is presented to the feeler lever L' the corresponding sector lever can then fall freely to its full extent.

The process of feeding in an item involves rotational movement of each template M by some suitable means actuated directly or indirectly through keys and levers. A convenient arrangement is to provide a flexible tape or cord P one end of which is fixed while the other end after passing over one or more pulleys such as Q is attached to a drum connected to the template M. In my copending application, Serial No. 343,629, filed December 9, 1919, is described and illustrated a mechanism employing a flexible tape or cord such as above suggested and which mechanism is well adapted for the present purposes. Tension is maintained on this tape P by means of a spring not shown in the drawings which is coiled on the shaft N and disposed within and connected to a casing on the template so that the latter constantly tends to rotate in the direction of the arrow in Figure 2. Such rotation cannot take place unless one of the pulleys such as Q over which the tape P passes is allowed to move, each of these pulleys being mounted for this purpose on a member Q' which can slide in a guide slot $Q^2$. When a pulley so moves to an extent proportional to one or more integers the template M is permitted to rotate to an equivalent extent the template being thus positioned so as to determine the extent to which the corresponding sector pulley can fall. By suitable arrangement of the pulleys Q which arrangement forms part of a separate mechanism the necessary items can be fed into the machine. When it is desired to clear the machine and return the number wheels to zero the template M has to be rotated backwards or counterclockwise, as viewed in Figure 2, to a small extent in order to present the large notch $M^2$ to the feeling lever L'. This rotation is brought about by upward movement of the pulley Q which exerts a pull on the tape P and causes the desired rotation of the template. The raising of the pulley Q is brought about by a lever R pivoted at R' and operated by mechanism to be hereinafter described. The end of the lever R when raised engages a lever $Q^3$ whose fulcrum is at $Q^4$ this lever being pivotally connected to the sliding member Q' by means of a pin $Q^5$ and slot $Q^6$, thus when the lever $Q^3$ is raised it will slide in an upward direction the member Q' and lift the pulley Q thus pulling the tape P and rotating the template M to the desired extent.

Since the machine here more particularly described is not constructed of such capacity as to permit of an item as large as one thousand pounds being fed into it, the mechanism of the thousand pounds unit and more particularly the sector lever C C' thereof is not provided with a rearwardly extending arm L' for the purpose of feeling the depth of notches in a template M since no such template is provided for feeding in purposes. The construction of such a sector lever for the unit of highest denomination is as already indicated illustrated in Figure 10. As there is no occasion to allow this sector lever to fall forward when the bar K is removed since there is no template to control the extent of such movement, it is necessary to provide some means for holding the lever when the bar K is removed. Such device must however permit the overmovement in the return direction in order to effect a carry into the thousand pounds unit. It must also be possible to allow the lever to fall freely on removal of the bar K when it is desired to clear the machine and return all the number wheels to zero. The device employed for thus controlling the movement of this sector lever is shown in Figures 10 and 11 and comprises a lever S pivoted at S' on the frame member D'. The end $S^2$ of this lever S is shaped so as to engage a gap or notch formed at B' in the rearward end of the toothed sector B carried by the lever C C'. By engagement of the end of the lever S with this notch D' the lever C C' is prevented from falling forward when the bar K moves away. If however a carry is to be effected into this unit and the carry lever projection H' has been moved out of the path of the sector lever projection $C^4$, then this sector lever is free to receive the overmovement towards the rear the notch B' being of sufficient dimensions to permit of this.

The lever S is provided with a downwardly directed projection $S^3$ the end of which bears on the lever R so that when the latter lever is lifted the lever S will also be lifted and its end $S^2$ moved clear of the notch B'. Thus when the lever R is raised for the purpose of enabling the machine to be cleared and the number wheels rotated back to zero, the sector lever C C' is freed so that at the proper stage of the clearing cycle when the bar K moves away this sector lever can fall with the other sector levers and rotate its number wheel to zero. When the bar K once more raises this sector lever the lever S falls so that its end $S^2$ once more engages the notch B'.

Figure 12:
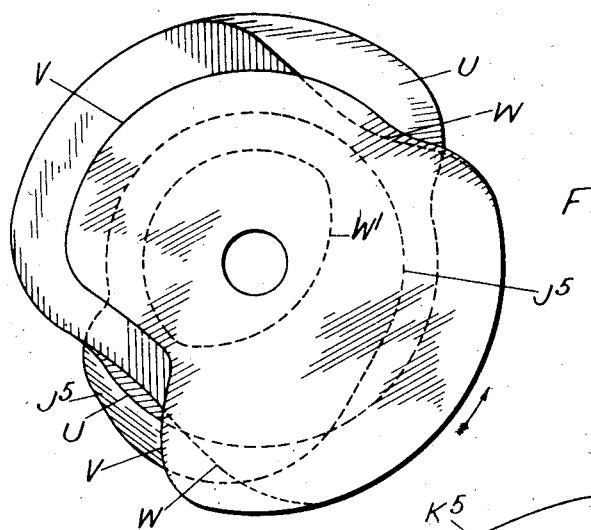
Figure 12 is a side elevation of the main operating cams.
Figure 13:
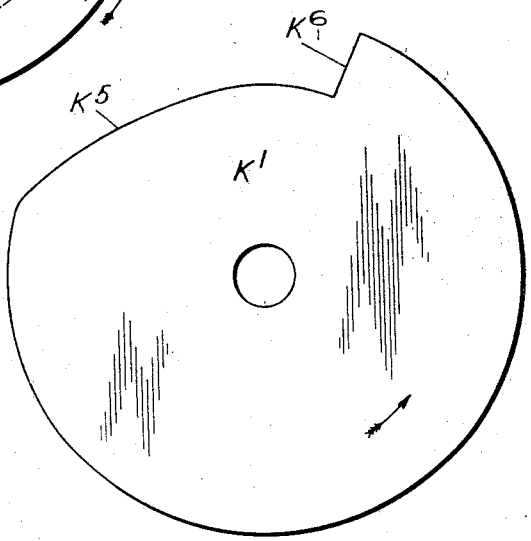
Figure 13 is a side elevation of another cam.
Figure 21:
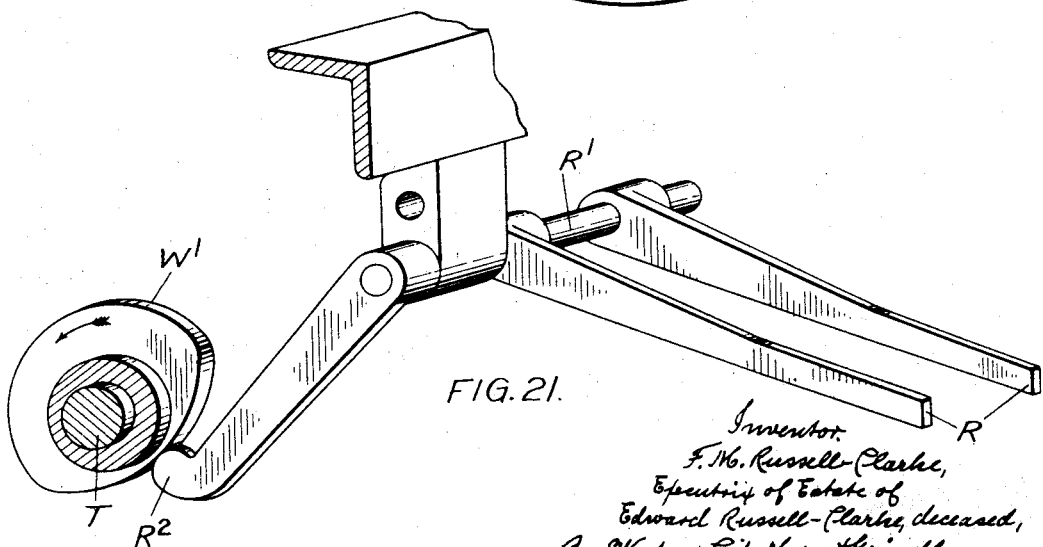
Figures 19, 20 and 21 are also perspective views of certain of the cam members of the mechanism together with the mechanism operated thereby.
Figure 17:
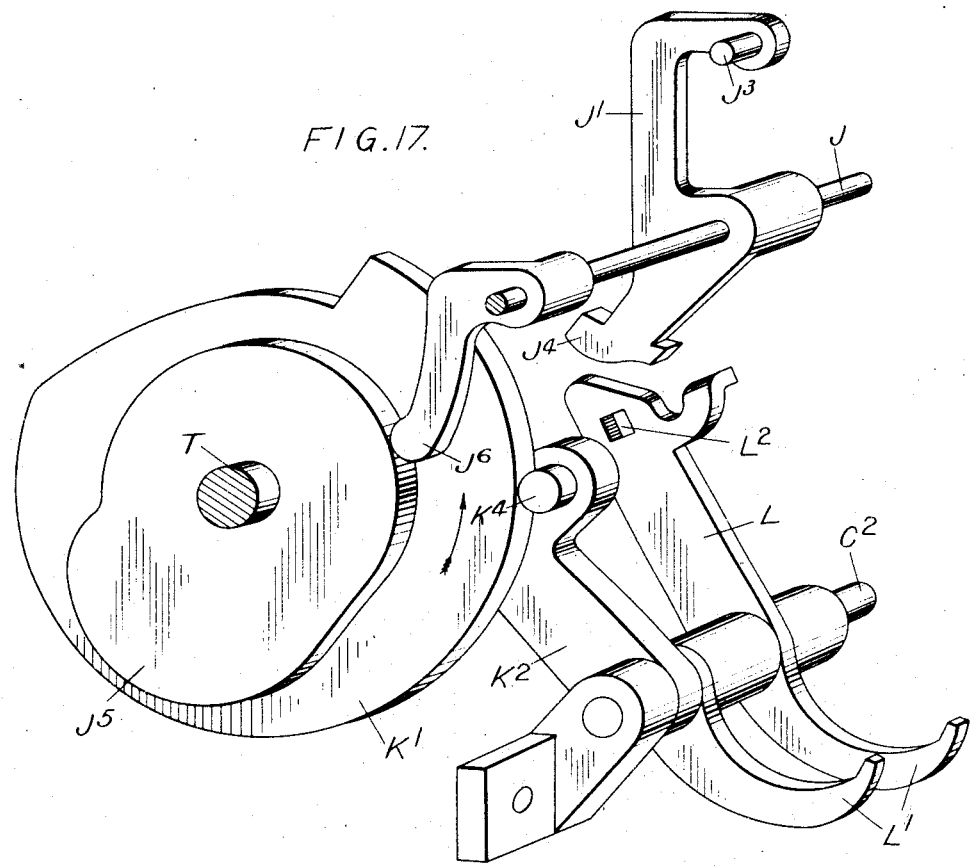
Figure 17 is a perspective view of one of the cams included in the machine and its associated mechanism.
Figure 18:
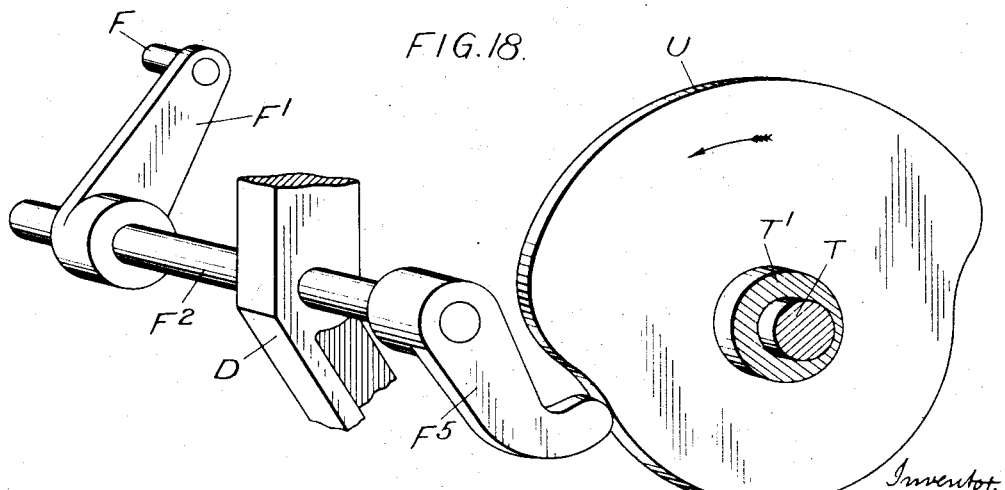
Figure 18 is a perspective view of another cam together with the parts immediately operated thereby.
Figure 19:
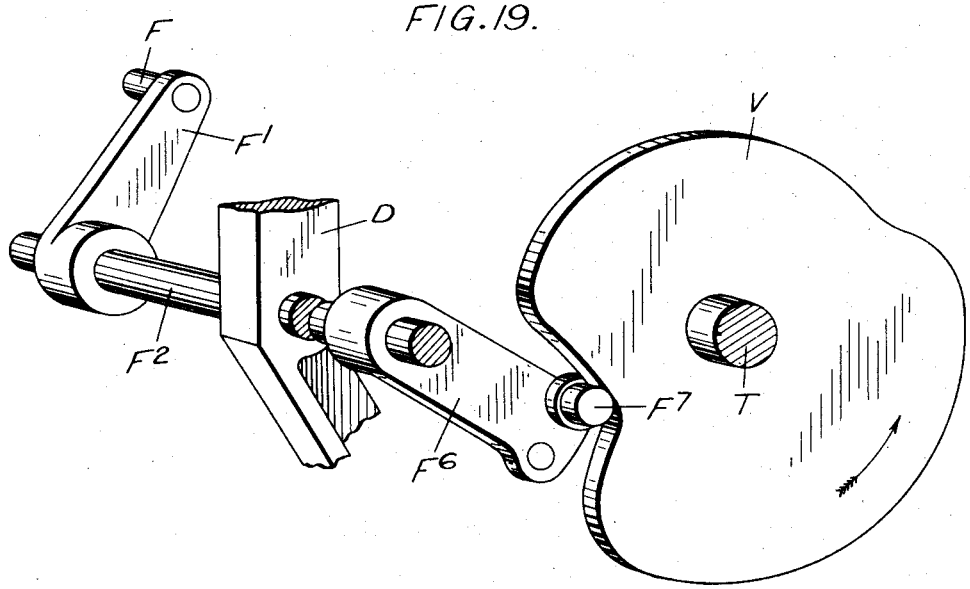
Figure 20:
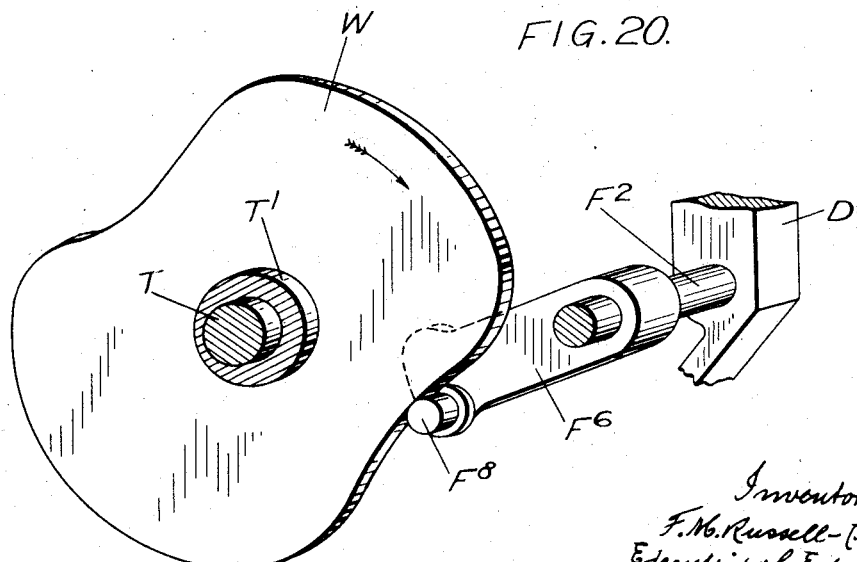

Turning now to the mechanism for actuating the machine this is shown at the right hand end of Figure 1 and partly in end view in Figure 2, the cams which impart movement to the several operating levers being shown separately in Figures 12 and 13.

On a rotatable shaft T is carried a boss T' which is connected to the shaft by a keyway and feather or in some other suitable manner so that while the boss must rotate with the shaft T it can be moved axially thereon. Fixed on this boss T' are four cams U, V, W and W'. The cam U serves to bring about the necessary cycle of operations when addition is being performed. The cam V serves in the same way when subtraction is being performed. The cams W and W' operate together to perform the necessary function involved when clearing the machine and returning the number wheels to zero. Two other cams $J^5$ and K' are also carried by the shaft T but so mounted thereon that they are constantly in operation. The cam $J^5$ brings about the resetting of the carry levers while by means of the cam K' the bar K is moved so as to permit the sector levers to fall and subsequently restore them to their zero positions. The boss T' with the cams U, V, W and W' carried thereon is shifted axially by means of a lever $T^2$ pivoted at $T^3$ and provided with lugs $T^4$ so positioned between the opposite faces of the cams W and V that when the lever $T^2$ is rocked the boss T' will be caused to move along the shaft T. By movement of the lever $T^2$ successively into three positions the cams are set so as to cause the machine to perform either addition or subtraction or to be cleared. When the lever $T^2$ is in the mid-position as shown in Figure 1 it is set for performing addition. Movement of this lever to the left sets the mechanism for subtraction while movement to the right of the mid-position sets it for clearing.

On the rockshaft $F^2$, which as already mentioned carries the levers F' by means of which the plates E which carry the number wheels are raised and lowered, is keyed a lever $F^5$ so positioned that when the lever $T^2$ is set for performing addition the end of the lever $F^5$ will bear against the periphery of the cam U. Also keyed on the rockshaft $F^2$ is the lever $F^6$ which has projecting from it towards its end and on opposite sides thereof studs which carry rollers $F^7$ and $F^8$. The roller $F^7$ is so positioned that when the lever $T^2$ is set for performing subtraction this roller will lie against the periphery of the cam V. Similarly when the lever $T^2$ is set for clearing the machine the roller $F^8$ will lie against the periphery of the cam W. To the rear of the shaft T as viewed in Figure 1 lies a lever $R^2$ which is keyed on the rockshaft R' on which are mounted the levers R by means of which a backward rotation is imparted to the templates M when it is necessary to clear the machine and allow all the sector levers to fall freely. The end of the lever $R^2$ is so placed with relation to the cam W' that when the lever $T^2$ is set for clearing the machine the end of this lever $R^2$ will bear on the periphery of the cam W' which will impart to the levers R and $R^2$ the motions necessary to perform the operations described above.

A lever $J^6$ whose end constantly bears against the face of the cam $J^5$ is keyed on the rockshaft J on which are the levers which effect the resetting of the carry levers H. Thus as the cam $J^5$ rotates the shaft J is rocked and the resetting of the carry levers brought about at the proper state in the cycle performed by the machine as previously described.

The bar K which raises the sector levers C C' is carried on levers $K^2$ keyed on the rock shaft $C^2$ and one of these levers has an arm $K^3$ on which is a laterally projecting pin or roller $K^4$ so disposed as to bear against the face of the cam K'. As the latter rotates in the direction of the arrow in Figure 13 the bar K remains in its raised position until the flat and cutaway part $K^5$ reaches the pin $K^4$ when sufficient clearance is left for the pin $K^4$ and lever $K^2$ to fall together with the bar K. When the cam has rotated to the point where the notch $K^6$ is presented to the pin $K^4$ the latter is picked up and the lever $K^2$ turned back again to its initial position where it is kept by the pin resting on the higher part of the cam.

The shapes of the cams U, V and W are as shown in Figure 12 and when acting respectively on the levers $F^5$ and $F^6$ cause the shaft $F^2$ to be so rocked as to raise and lower the number wheel plates in accordance with the sequence of operations performed as the machine goes through the cycles above described.

On one end of the shaft T is mounted a toothed wheel $T^5$ which gears with a pinion $T^6$ on one end of a counter shaft $T^7$ which carries at its other end a toothed wheel $T^8$. The latter gears with a pinion $T^9$ mounted on a driving shaft $T^{10}$ to which rotation is imparted by power transmitted through a pulley wheel X and clutch mechanism Y controlled by a key lever Z. In this way the shaft T can be rotated and the whole mechanism of the calculating machine actuated by power as desired, the clutch mechanism preferably being so constructed and arranged that it will automatically disconnect the source of power from the actuating mechanism at the completion of each half cycle.

This clutch mechanism is illustrated in detail in Figures 14, 15, and 16. The shaft $T^{10}$ projects beyond the end of the frame and this projecting portion has revolubly mounted thereon a bevel wheel 100 which meshes with bevel gears 101 rotatably supported upon a shaft 102 which is pinned or otherwise rigidly secured to the shaft $T^{10}$. The shaft $T^{10}$ also supports the bevel wheel 103 which meshes with gears 101 and is connected to, by means of a sleeve 104, a pulley 105 so that the bevel wheel 103 and pulley 105 are constrained to rotate together. This pulley and its connected bevel wheel are freely rotatable on shaft $T^{10}$. One end 106 of shaft 102 is considerably extended upon the gear 101 positioned at that end of the shaft and bevel wheel 100 has on its rear face a projection 107. The clutching action of the mechanism is brought about by shifting the plate 108 forwardly and rearwardly of the machine, this plate bearing stops 109 and 110 which cooperate respectively with projections 106 and 107 in effecting the connection and disconnection of the shaft $T^{10}$ and pulley X.

In the position occupied by plate 108 in Figure 14 the pulley and shaft are disconnected, the end 106 of shaft 102 resting upon the stop 109 and the bevel wheel 100 being free to rotate at the same speed as bevel wheel 103 but in the opposite direction, the stop 110 lying without the pathway of the projection 107. Assuming plate 108 to be moved toward the left, as shown in Figure 16, the stop 109 will have disengaged the shaft 102, while stop 110 will have moved into the pathway of projection 107. Bevel wheel 100 is therefore held against rotation and as a result the shaft 102 will move, being driven by gears 101 while at half the speed of bevel wheel 103. The shaft $T^{10}$ therefore moves at half speed.

The movement of the plate 108 to cause the operative engagement of the pulley X and shaft $T^{10}$ is effected by a lever Z which is pivoted at 111 and has a downwardly extending arm 112. A spring 113 normally tends to keep the lever Z in the horizontal position shown. When the lever Z is depressed the lower end of arm 112 rides over the upturned end of pawl 114 which is pivoted to the plate 108, and normally held in the position illustrated in Figure 14 by a spring 115 which holds it against a stop 116. When pressure is removed from the end of the lever Z the spring 113 returns it to horizontal position and thereby effects the movement of the plate 108 as the lower end of the arm 112 is now bearing against the end of pawl 114, as shown in Figure 16. Connection is now made between pulley Z and shaft $T^{10}$ and the latter shaft will continue to rotate until the stop 118 on gear $T^{5}$ strikes the lower end of pawl 114 and moves it into the dotted line position (Figure 16). The spring 117 immediately returns the plate 108 to its right hand position (Figure 14) thereby disconnecting the driving pulley and the driven shaft $T^{10}$. A single depression of key Z therefore effects a half revolution of shaft T and the several cams mounted thereon and a second depression of this key will bring about a completion of the rotatory movement through exactly 360°, there being two projections 118 arranged 180° apart, as shown in Figure 14.

Thus the mechanism in the process of performing a complete operation or cycle for addition or subtraction is stopped at the stage in which the number wheel plates E are in their intermediate positions with the pinions G G' out of engagement with the sectors A and B. When the machine is being cleared the interruption in the cycle occurs at the stage when the pinions G G' have been raised and put into engagement with the sectors A but before the latter have been allowed to fall and rotate all the number wheels back to their zero points.

The front of the machine is preferably closed in by a plate or casing in which are windows so situated that the numbers on the flanges $G^{a}$ of the wheels can be observed so that the totals ascertainable by the machine can be read.

It is to be understood that the machine may be applied to various purposes and employed for performing sums in addition or substraction not only in different monetary systems but also with weights and measures and simple numbers. As indicated above it is mainly intended to be combined and used in conjunction with a machine for performing multiplication and the mechanism for feeding in the sums as herein described and illustrated more particularly refer to that employed in such a combined machine. The sums, however, may be fed direct into the adding machine in various ways as found convenient.

What I claim as the invention of EDWARD RUSSELL CLARKE deceased, and desire to secure by Letters Patent is:—

1. In a calculating machine for performing addition or subtraction the combination of a series of cooperating mechanical units each comprising a pair of pivotally mounted concentric curved sectors one of which is toothed on its concave side while the other is toothed on its convex side, a double pinion adapted to engage either of the toothed sectors, a number wheel carried by the double pinion, and a detent by means of which the number wheel is locked against rotation except when the pinion is in engagement with one of the sectors, means by which all the double pinions can be simultaneously moved into engagement with either of the sectors in their respective units, and means for moving and positioning the sectors in accordance with items fed into the machine as set forth.

2. In a calculating machine for performing addition or subtraction the combination of a series of cooperating mechanical units each comprising a pair of pivotally mounted concentric curved sectors one of which is toothed on its concave side while the other is toothed on its convex side, a double pinion adapted to engage either of the toothed sectors, a number wheel carried by the double pinion, a detent by means of which the number wheel is locked against rotation except when the pinion is in engagement with one of the sectors, a removable stop which determines the limit of movement of the toothed sectors in the zero direction, means by which all the double pinions can be simultaneously moved into engagement with either of the sectors in their respective units, and means for moving and positioning the sectors in accordance with items fed into the machine as set forth.

3. In a calculating machine for performing addition or subtraction the combination of a series of cooperating mechanical units each comprising a pair of pivotally mounted concentric curved sectors one of which is toothed on its concave side while the other is toothed on its convex side, a double pinion adapted to engage either of the toothed sectors, a number wheel carried by the double pinion, a detent by means of which the number wheel is locked against rotation except when the pinion is in engagement with one of the sectors, a removable stop which determines the limit of movement of the curved sectors in the zero direction, means by which all the double pinions can be simultaneously moved into engagement with either of the sectors in their respective units, means for moving and positioning the sectors in accordance with items fed into the machine, and means for simultaneously setting back all the positioned sectors in the zero direction after the pinions have been engaged with them as set forth.

4. In a calculating machine for performing addition or subtraction the combination of a series of cooperating mechanical units each comprising a pair of pivotally mounted concentric curved sectors one of which is toothed on its concave side while the other is toothed on its convex side, a double pinion adapted to engage either of the toothed sectors a number wheel carried by the double toothed pinion and comprising a flanged disc with notches in the flange at intervals corresponding to numbers marked on the flange, and a detent carried on a fixed part and adapted to engage the notches in the number wheel and lock this wheel against rotation when the double pinion is in an intermediate position and is not in engagement with either of the toothed sectors, means by which all the double pinions can be simultaneously moved into engagement with either of the sectors in their respective units, and means for moving and positioning the sectors in accordance with items fed into the machine as set forth.

5. In a calculating machine for performing addition or subtraction the combination of a series of cooperating mechanical units each comprising a pair of pivotally mounted concentric sectors one of which is toothed on its concave side while the other is toothed on its convex side, a double pinion adapted to engage either of the toothed sectors, a number wheel carried by the double pinion, and a detent by means of which the number wheel is locked against rotation except when the pinion is in engagement with one of the sectors, means by which all the double pinions can be simultaneously moved into engagement with either of the sectors in their respective units, means for moving and positioning the sectors in accordance with items fed into the machine, and mechanism for clearing the machine and returning the number wheels to zero comprising means for bringing each double pinion into engagement with one of its corresponding toothed sectors, means for permitting all the toothed sectors to then fall freely until they have rotated the number wheels to their zero points, and means for subsequently moving all the pinions out of engagement from their sectors and for returning the latter to their zero positions as set forth.

6. In a calculating machine for performing addition or subtraction the combination of a series of cooperating mechanical units each comprising a pair of pivotally mounted concentric curved sectors one of which is toothed on its concave side while the other is toothed on its convex side, a double toothed pinion adapted to engage either of the toothed sectors, a number wheel carried by the double pinion and comprising a flanged disc with notches in the flange at intervals corresponding to numbers marked on the flange, a detent carried on a fixed part and adapted to engage the notches in the number wheel, and lock this wheel against rotation when the double pinion is in an intermediate position and is not in engagement with either of the toothed sectors, a removable stop which determines the limit of movement of the curved sectors in the zero direction, means by which all the double pinions can be simultaneously moved into engagement with either of the sectors in their respective units, means for moving and positioning the sectors in accordance with items fed into the machine, and means for simultaneously setting back all the positioned sectors in the zero direction after the pinions have been engaged with them as set forth.

7. In a calculating machine for performing addition or subtraction the combination of a series of cooperating mechanical units each comprising a pair of pivotally mounted concentric curved sectors one of which is toothed one its concave side while the other is toothed on its convex side, a double pinion adapted to engage either of the toothed sectors, a number wheel carried by the double pinion, a detent by means of which the number wheel is locked against rotation except when the pinion is in engagement with one of the sectors, a removable stop which determines the limit of movement of the toothed sectors in the zero direction, means by which all the double pinions can be simultaneously moved into engagement with either of the sectors in their respective units, means for moving and positioning the sectors in accordance with items fed into the machine, and mechanism for clearing the machine and returning the number wheels to zero comprising means for bringing each double pinion into engagement with one of its corresponding toothed sectors, means for permitting all the toothed sectors to then fall freely until they have rotated the number wheels to their zero points and means for subsequently moving all the pinions out of engagement with their sectors and for returning the latter to their zero positions as set forth.

8. In a calculating machine for performing addition or subtraction the combination of a series of cooperating mechanical units each comprising a pair of pivotally mounted concentric curved sectors one of which is toothed on its concave side while the other is toothed on its convex side, a double pinion adapted to engage either of the toothed sectors, a number wheel carried by the double pinion, a detent by means of which the number wheel is locked against rotation except when the pinion is in engagement with one of the sectors, a removable stop which determines the limit of movement of the curved sectors in the zero direction, means by which all the double pinions can be simultaneously moved into engagement with either of the sectors in their respective units, means for moving and positioning the sectors in accordance with items fed into the machine, mechanism for clearing the machine and returning the number wheels to zero comprising means for bringing each double pinion into engagement with one of its corresponding toothed sectors, means for permitting all the toothed sectors to then fall freely until they have rotated the number wheels to their zero points and means for subsequently moving all the pinions out of engagement with their sectors and for returning the latter to their zero positions, a series of rotatable cams operative to cause the parts of the machine to perform their several functions some of these cams being constantly in action while others are for alternative use according to whether the machine is being employed to perform addition or subtraction or is being cleared, means for rotating these cams, and mechanism for selecting and bringing into action the cams necessary for the required operation as set forth.

9. In a calculating machine for performing addition or subtraction the combination of a series of cooperating mechanical units each comprising a pivoted lever on which are mounted a pair of curved sectors disposed concentrically with relation to the fulcrum of the lever one of these sectors being toothed on its concave side while the other is toothed on its convex side, a double pinion adapted to engage either of the toothed sectors, a number wheel carried by the double pinion, a detent by means of which the number wheel is locked against rotation when the pinion is in engagement with one of the sectors, means by which all the double pinions can be simultaneously moved into engagement with either of the sectors in their respective units, means for separately moving and positioning the sector levers in accordance with the value of items fed into the machine, and means for indicating by the positioning of the sector levers the values of these items as set forth.

10. A calculating machine for performing addition or subtraction, including in combination, a number wheel having a driving pinion attached thereto, two racks movable along parallel paths for engaging the pinion, means for bringing the pinion into engagement with either of said racks, and a detent by means of which the number wheel is locked against rotation except when the pinion is in engagement with one of the racks.

11. A calculating machine for performing addition or subtraction, including in combination, a number wheel, means for rotating the wheel in one direction when addition is to be performed and in the other direction when subtraction is to be performed, and a detent for holding the wheel against movement except when operated by said means.

12. In a calculating machine for performing addition or subtraction, the combination of a series of mechanical units each comprising a flanged disc with notches in the flange at intervals corresponding to numbers marked on the flange, means for rotating the wheel in either direction, and a detent to engage the notches in the number wheel to lock the wheel against rotation when said rotating means is not operatively connected to the wheel.

13. In a calculating machine for performing addition or subtraction, the combination of a series of mechanical units each comprising a flanged disc with notches in the flange at intervals corresponding to numbers marked on the flange, a pinion rigid with the number wheel, movable racks normally disengaged from the pinion but adapted to be singly engaged therewith to rotate the wheel in either direction, and a detent to engage the notches in the number wheel to lock the wheel against rotation except when the pinion is engaged by one of said racks.

14. In a calculating machine for performing addition or subtraction the combination of a series of cooperating mechanical units, each comprising a pivoted lever, two spaced curved and toothed sectors mounted on the lever and disposed concentrically with respect to the pivotal axis of the lever, a pinion adapted to engage either sector, a number wheel carried by the sector and means for moving the pinion into engagement with either sector.

15. In a calculating machine for performing addition or subtraction, the combination of a pivoted lever, two spaced curved and toothed sectors mounted on the lever and disposed concentrically with respect to the pivotal axis of the lever, a pinion adapted to engage either sector, a number wheel carried by the sector, and means for moving the pinion into engagement with either sector.

In testimony whereof I have signed my name to this specification.

FRANCES MAUD RUSSELL-CLARKE,
*Sole Executrix of Edward Russell-Clarke, Deceased.*